United States Patent
Purohit et al.

(10) Patent No.: US 9,686,062 B2
(45) Date of Patent: Jun. 20, 2017

(54) VIRTUAL AGGREGATION OF FRAGMENTED WIRELESS SPECTRUM

(75) Inventors: Vinay Purohit, Branchburg, NJ (US); Paul A. Wilford, Bernardsville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 243 days.

(21) Appl. No.: 13/040,458

(22) Filed: Mar. 4, 2011

(65) Prior Publication Data

US 2012/0224646 A1    Sep. 6, 2012

(51) Int. Cl.
*H04L 5/14* (2006.01)
*H04B 7/00* (2006.01)
*H04L 12/28* (2006.01)
*H04J 3/00* (2006.01)
*H04L 5/00* (2006.01)
*H04L 5/06* (2006.01)

(52) U.S. Cl.
CPC ............. *H04L 5/0044* (2013.01); *H04L 5/06* (2013.01); *H04L 5/001* (2013.01)

(58) Field of Classification Search
CPC ............ H04L 5/004; H04L 5/06; H04L 5/001
USPC ......................................... 370/474
See application file for complete search history.

(56) References Cited

U.S. PATENT DOCUMENTS

| | | | |
|---|---|---|---|
| 5,682,195 A * | 10/1997 | Hendricks | H04H 20/06 348/E5.002 |
| 5,742,361 A | 4/1998 | Nakase et al. | |
| 6,138,147 A | 10/2000 | Weaver et al. | |
| 6,173,429 B1 | 1/2001 | Twitchell et al. | |
| 6,493,873 B1 * | 12/2002 | Williams | H04H 20/63 375/E7.002 |
| 6,598,200 B1 | 7/2003 | Greenwood et al. | |
| 6,738,434 B2 | 5/2004 | Friedman | |
| 7,085,306 B1 | 8/2006 | Voldman et al. | |
| 7,116,652 B2 * | 10/2006 | Lozano | H04B 7/0417 370/334 |
| 7,218,901 B1 | 5/2007 | Mobley et al. | |

(Continued)

FOREIGN PATENT DOCUMENTS

| | | |
|---|---|---|
| CN | 1946054 A | 4/2007 |
| CN | 1949934 A | 7/2007 |

(Continued)

OTHER PUBLICATIONS

The International Search Report and The Written Opinion of the International Searching Authority, or the Declaration in PCT/US2012/026437, mailed Jun. 26, 2012, Alcatel-Lucent USA Inc., Applicant, 14 pages.

(Continued)

*Primary Examiner* — Faruk Hamza
*Assistant Examiner* — Abu-Sayeed Haque
(74) *Attorney, Agent, or Firm* — Tong, Rea, Bentley & Kim, LLC

(57) ABSTRACT

Method and apparatus for aggregating spectrum in which multiple disjoint blocks of spectrum may be configured as one virtual contiguous block of spectrum by modulating onto each disjoint blocks of spectrum a respective portion of a data stream in which the data rate associated with the modulated portion is compatible with the available bandwidth of the disjoint spectrum block upon which is modulated.

21 Claims, 14 Drawing Sheets

(56) References Cited

U.S. PATENT DOCUMENTS

| | | |
|---|---|---|
| 7,577,881 B1 | 8/2009 | Shridhar et al. |
| 7,646,834 B2 | 1/2010 | Friedman |
| 7,724,676 B2 | 5/2010 | Gerstel et al. |
| 2002/0051461 A1 | 5/2002 | Calderone |
| 2003/0210663 A1 | 11/2003 | Everson et al. |
| 2004/0240415 A1 | 12/2004 | Lane |
| 2005/0031047 A1 | 2/2005 | Maltsev et al. |
| 2005/0233710 A1 | 10/2005 | Lakkis et al. |
| 2005/0260984 A1* | 11/2005 | Karabinis .......... H04B 7/18563 455/428 |
| 2006/0008085 A1 | 1/2006 | Matsuo |
| 2006/0034164 A1 | 2/2006 | Ozluturk |
| 2006/0194562 A1* | 8/2006 | Marrah ................ H04H 40/90 455/334 |
| 2006/0269282 A1 | 11/2006 | Gerstel |
| 2007/0049200 A1 | 3/2007 | Nagai |
| 2007/0054682 A1* | 3/2007 | Fanning ............ H04L 27/2608 455/509 |
| 2007/0117532 A1* | 5/2007 | Kim ...................... H03J 1/005 455/334 |
| 2007/0147251 A1 | 6/2007 | Monsen |
| 2007/0291854 A1* | 12/2007 | Song .................. H04N 21/235 375/240.27 |
| 2008/0112312 A1 | 5/2008 | Hermsmeyer et al. |
| 2008/0133935 A1 | 6/2008 | Elovici et al. |
| 2008/0205432 A1* | 8/2008 | Gangwal ............. H04L 45/40 370/458 |
| 2008/0212708 A1* | 9/2008 | Koslov .............. H04L 27/0014 375/286 |
| 2008/0232298 A1 | 9/2008 | Kim et al. |
| 2008/0291984 A1 | 11/2008 | Heise et al. |
| 2009/0075664 A1* | 3/2009 | Palanki ................ H04L 5/0044 455/446 |
| 2009/0086759 A1 | 4/2009 | Heise et al. |
| 2009/0161592 A1 | 6/2009 | So |
| 2009/0175278 A1 | 7/2009 | Harel et al. |
| 2009/0274240 A1 | 11/2009 | Oshima |
| 2009/0290659 A1 | 11/2009 | Petrovic et al. |
| 2010/0021166 A1 | 1/2010 | Way |
| 2010/0086066 A1* | 4/2010 | Chrabieh ............. H04L 5/0007 375/260 |
| 2010/0118769 A1 | 5/2010 | Agarwal |
| 2010/0124332 A1 | 5/2010 | Arena |
| 2010/0150211 A1 | 6/2010 | Gerakoulis et al. |
| 2010/0195561 A1* | 8/2010 | Yamaguchi ........ H04B 7/15542 370/315 |
| 2010/0211787 A1 | 8/2010 | Bukshpun et al. |
| 2010/0211854 A1* | 8/2010 | Wu ...................... H04L 1/007 714/776 |
| 2010/0272190 A1* | 10/2010 | Kim .............. H04N 21/234327 375/240.26 |
| 2010/0284325 A1* | 11/2010 | Yabo ................ H04B 7/18582 370/322 |
| 2011/0032892 A1 | 2/2011 | Bahl et al. |
| 2011/0103316 A1* | 5/2011 | Ulupinar ............ H04L 12/5693 370/329 |
| 2011/0128853 A1* | 6/2011 | Nishimura .......... H04L 47/10 370/235 |
| 2011/0185168 A1 | 7/2011 | Schlacht et al. |
| 2012/0093103 A1* | 4/2012 | Lee .................... H04L 5/0053 370/329 |
| 2012/0163178 A1 | 6/2012 | Gordon et al. |
| 2012/0182948 A1* | 7/2012 | Huang ................ H04L 5/001 370/329 |
| 2012/0219066 A1 | 8/2012 | Amonou et al. |
| 2012/0224646 A1* | 9/2012 | Purohit ................ H04L 5/06 375/259 |
| 2012/0263067 A1* | 10/2012 | Kim .................... H04W 72/082 370/252 |
| 2012/0323523 A1* | 12/2012 | Yoshikawa ............ G01P 3/489 702/149 |
| 2013/0039251 A1 | 2/2013 | Wilkinson et al. |
| 2013/0182690 A1 | 7/2013 | Kovacs et al. |
| 2014/0071908 A1* | 3/2014 | Sachs .................... H04L 1/1893 370/329 |
| 2015/0205569 A1* | 7/2015 | Sanders ................ G06F 3/165 381/71.14 |

FOREIGN PATENT DOCUMENTS

| | | |
|---|---|---|
| EP | 0 642 228 A2 | 3/1995 |
| EP | 0 721 267 A2 | 7/1996 |
| EP | 1 921 754 A1 | 5/2008 |
| EP | 1 995 901 A2 | 11/2008 |
| EP | 2 093 957 A1 | 8/2009 |
| EP | 2093957 A1 | 8/2009 |
| EP | 2 264 931 A1 | 12/2010 |
| JP | H07312593 A | 11/1995 |
| JP | H0973565 A | 3/1997 |
| JP | H1065652 A | 3/1998 |
| JP | 2003198416 A | 7/2003 |
| JP | 2004056569 A | 2/2004 |
| JP | 2009-225337 | 10/2009 |
| JP | 2009/290899 A | 12/2009 |
| JP | 2010/232857 A | 10/2010 |
| WO | WO 02/05506 A2 | 1/2002 |
| WO | WO 02/078211 A2 | 10/2002 |
| WO | WO 02/093779 A2 | 11/2002 |
| WO | WO 2007/149961 A1 | 12/2007 |
| WO | WO 2011/009157 A1 | 1/2011 |
| WO | WO 2011/038272 A1 | 3/2011 |

OTHER PUBLICATIONS

The International Search Report and The Written Opinion of the International Searching Authority, or the Declaration in PCT/US2012/034059, mailed Jun. 27, 2012, Alcatel-Lucent USA Inc., Applicant, 15 pages.

The International Search Report and The Written Opinion of the International Searching Authority, or the Declaration in PCT/US2012/038050, mailed Jul. 3, 2012, Alcatel-Lucent USA Inc., Applicant, 12 pages.

Kholaif A M et al: "DRKH: A Power Efficient Encryption Protocol for Wireless Devices," Local Computer Networks, 2005. 30$^{th}$ Anniversary. The IEEE Conference on Sydney, Australia Nov. 15-27, 2005, Piscataway, NJ, USA, IEEE, Nov. 15, 2005, pp. 822-829, XP010859299.

The International Search Report and Written Opinion of the International Searching Authority, or the Declaration in PCT/2013/040126, mailed Aug. 1, 2013, Alcatel Lucent USA Inc, Applicant, 10 pages.

Corresponding Japanese Office Action, Application No. 2013-557744, dated Oct. 23, 2014, pp. 1-6.

Office Action received in Korean Application No. 10-2013-7026044, dated Mar. 19, 2015, pp. 1-8.

Office Action received in Chinese Application No. 201280011631.2, dated Apr. 1, 2015, pp. 1-7.

Junichi Abe et al., "Bandwith Decomposition Employing Spectrum Editing Technique for High Frequency Utilization Efficiency", Technical Reports of IEICE (Institute of Electronics, Information and Communication Engineers), Dec. 10, 2009, vol. 109, No. 340, pp. 7-12.

Takeshi Matsumura, et al., "Up-conversion Type RF Front-end for TV White-space Wireless Communication System", IEICE Technical Report, Oct. 20, 2010, vol. 110, No. 252, pp. 19-23, SR2010-43.

Li Li et al., "Resource Allocation for OFDMA-based Cognitive Radio Systems with Primary User Activity Consideration," Communications(ICC), 2011 IEEE International Conference on, Jun. 9, 2011, 9 Pages.

* cited by examiner

VIRTUAL AGGREGATION OF FRAGMENTED WIRELESS SPECTRUM

FIELD OF THE INVENTION

The invention relates generally to communication networks and, more specifically, but not exclusively, to satellite- and microwave-based point-to-point communication and backhaul links.

BACKGROUND

Traditional wireless systems assume the availability of a contiguous block of spectrum with bandwidth proportional to the amount of data to be transmitted. Transmission systems are thus frequently designed for worst-case bandwidth requirements with the typical or average use-case, in some instances, requiring much less bandwidth (i.e., spectrum).

Within the context of satellite communications systems and other point-to-point communications systems, available spectrum allocated to customers may become fragmented over time, which leads to unused blocks between allocated blocks of spectrum. When the blocks of unused spectrum are too small, it is necessary to reallocate spectrum among customers or "move" a customer from existing spectral allocation to a new spectral allocation so that the unused blocks of spectrum may be coalesced into a single spectral region. Unfortunately, such reallocation is very disruptive.

BRIEF SUMMARY

Various deficiencies of the prior art are addressed by the present invention of systems, methods and apparatus aggregating spectrum in which multiple disjoint blocks of spectrum may be configured as one virtual contiguous block of spectrum by modulating onto each disjoint blocks of spectrum a respective portion of a data stream in which the data rate associated with the modulated portion is compatible with the available bandwidth of the disjoint spectrum block upon which is modulated.

A method according to one embodiment comprises dividing a data stream into a plurality of sub-streams, each of the sub-streams associated a respective spectral fragment and having a data rate compatible with a bandwidth of the respective spectral fragment; modulating each of the sub-streams to provide a modulated signal adapted for transmission via the respective spectral fragment; and upconverting the modulated signals onto respective spectral fragments of at least one carrier signal; wherein the sub-streams included within the upconverted modulated signals are adapted to be demodulated and combined at a receiver to recover thereby data stream.

An apparatus according to one embodiment comprises a splitter, for dividing a data stream into a plurality of sub-streams, each of the sub-streams associated a respective spectral fragment and having a data rate compatible with a bandwidth of the respective spectral fragment; a plurality of modulators, each modulator configured to modulate a respective sub-stream to provide a modulated signal adapted for transmission via the respective spectral fragment; and at least one upconverter, for upconverting the modulated signals onto respective spectral fragments of at least one carrier signal; wherein the sub-streams included within the upconverted modulated signals are adapted to be demodulated and combined at a receiver to recover thereby data stream.

The splitting function of the method or apparatus may include encapsulating sequential portions of the data stream into payload portions of respective encapsulating packets, each of the sequential portions of the data stream being associated with a respective sequence number included within a header portion of the respective encapsulating packet; and selectively routing encapsulated packets towards demodulators.

The selective routing may be based on routing encapsulating packets according any of a random routing algorithm, a round robin routing algorithm, a customer preference algorithm, a service provider preference algorithm and so on where each sub-stream is associated with a respective weight.

The various sub-streams may be modulated and up converted onto a carrier signal for transmission via one or more transponders within a satellite medication system, one or more microwave links within a microwave communications system and/or one or more wireless channels within a wireless communication system.

In various embodiments, encapsulated packets are routed multiple times to add resiliency/redundancy.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of a satellite communications system. However, those skilled in the art and informed by the teachings herein will realize that the invention is also applicable to any system benefiting from flexible spectral allocation, such as microwave communications systems, wireless communications systems and the like.

One embodiment provides an efficient and general-purpose technique for aggregating multiple, fragmented blocks of wireless spectrum into one contiguous virtual block such that the cumulative bandwidth is almost equal to the sum of the bandwidths of the constituent blocks. The fragmented blocks are optionally separated from each other by blocks of spectrum, such as guard blocks, blocks owned by other parties, blocks prohibited by the wireless spectrum regulatory authority of a region or country and so on.

Figure 1:
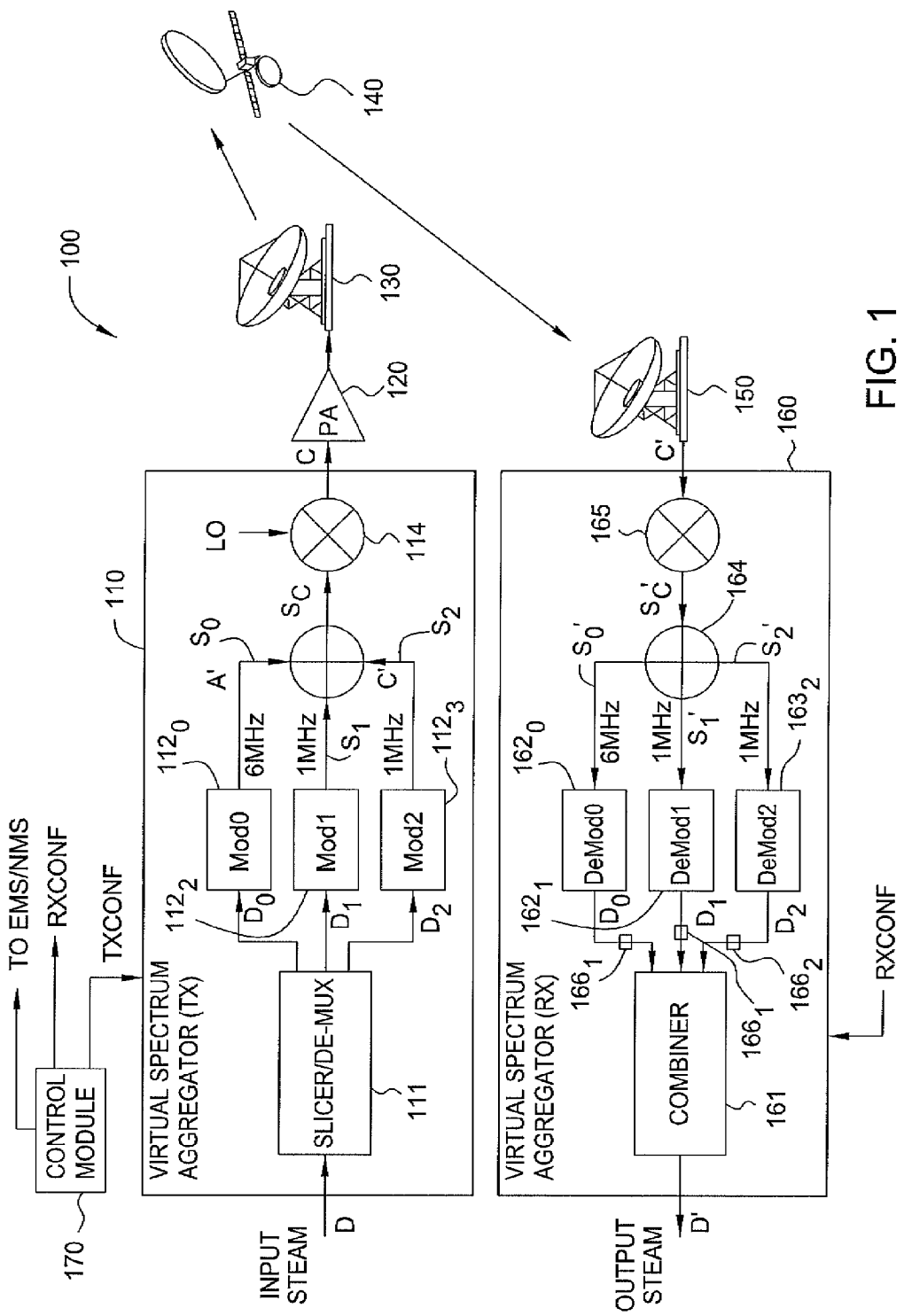
FIG. 1 depicts a block diagram of a communication system according to one embodiment.

FIG. 1 depicts a block diagram of a communication system benefiting from various embodiments. The communication system 100 of FIG. 1 comprises a point-to-point link including a virtual spectrum aggregator transmitter 110, a power amplifier 120, a satellite uplink 130, a satellite 140, a satellite downlink 150, a virtual spectrum aggregator receiver 160 and, optionally, a control module 170. Data to be transmitted over the point-to-point link is provided as a stream of data packets D, such as 188-byte transport stream (TS) packets, 64-1500 bytes Ethernet packets and so on. The specific packet structure, data conveyed within a packet structure and so on is readily adapted to the various embodiments described herein.

The input data stream D is received by the virtual spectrum aggregated transmitter 110, where it is processed by a slicer/demultiplexer 111 to provide N sub-streams ($D_0 \ldots D_{N-1}$), where N corresponds to a number of spectral fragments denoted as $S_0$, $S_1$ and so on up to $S_{N-1}$.

As depicted in FIG. 1, N=3 such that the slicer/demultiplexer 111 slices, the multiplexes and/or divides the input data stream D into (illustratively) three sub-streams denoted as $D_0$, $D_1$ and $D_2$.

Each of the sub-streams $D_0$, $D_1$ and $D_2$ is coupled to a respective modulator 112 (i.e., modulators $112_0$, $112_1$ and $112_2$). Each of the modulators $112_0$, $112_1$ and $112_2$ modulates its respective sub-stream $D_0$, $D_1$ and $D_2$ to provide corresponding modulated signals to be carried by respective spectral fragments $S_0$, $S_1$ and $S_2$.

The modulators 112 may comprise modulators having the same characteristics or having different characteristics, such as the characteristics of waveform type, constellation maps, forward error correction (FEC) settings and so on. Each modulator may be optimized according to a specific type of traffic (e.g., streaming media, non-streaming data and the like), the specific channel conditions associated with its corresponding spectral fragment $S_i$ and/or other criteria.

Generally speaking, the amount of data allocated by the slicer/demultiplexer 111 to any sub-stream $D_i$ is proportional to the data carrying capacity of the corresponding spectral fragment $S_i$. In various embodiments, each of the sub-streams $D_i$ comprises the same amount of data, while in other embodiments the various sub-streams $D_i$ may comprise different amounts of data.

As depicted in FIG. 1, the first modulator $112_0$ provides a 6 MHz signal associated with a first spectral fragment $S_0$; the second modulator $112_1$ provides a 1 MHz signal associated with a second spectral fragment $S_1$; and third modulator $112_2$ provides a 1 MHz signal associated with a third spectral fragment $S_2$.

A frequency multiplexer (i.e., signal combiner) 113 operates to combine the modulated signals to produce a combined modulated signal $S_C$, which is modulated onto a carrier signal by up-converter 114 to provide a modulated carrier signal C. It is noted that multiple frequency multiplexers/signal combiners 113 may be used to multiplex respective groups of modulated signals to be transported via common transponders, microwave links, wireless channels and the like.

In the embodiment of FIG. 1, the spectrum associated with the modulated carrier signal C is logically or virtually divided into the plurality of spectral fragments used to convey the modulated data sub-streams. The spectral fragment allocation table or other data structure is used to keep track of which spectral fragments have been defined, which spectral fragments are in use (and by which data sub-streams), and which spectral fragments are available. Generally speaking, each transponder/transmission channel may be divided into a plurality of spectral fragments or regions. Each of these spectral fragments or regions may be assigned to a particular data sub-stream. Each of the data sub-streams may be modulated according to a unique or common modulation technique.

As depicted in FIG. 1, a single satellite transponder is used and, therefore, all of the modulated signals may be combined by frequency multiplexer 113 prior to up-conversion and transmission via a single satellite channel. In various embodiments, multiple transponders within one or more satellites may be used. In these embodiments, only those modulated signals to be transmitted via a common transponder within a satellite are combined and then converted together. In various embodiments, modulate waveforms are transmitted independently.

The modulated carrier signal C produced by up-converter 114 is amplified by power amplifier 120 and transmitted to satellite 140 via satellite uplink 130. Satellite 140 transmits a modulated carrier signal including the modulated sub-streams $D_0$, $D_1$ and $D_2$ to satellite downlink 150, which propagates the signal to the virtual spectrum aggregator receiver 160.

Virtual spectrum aggregator receiver 160 includes a downconverter (165) which downconverts a combined spectral fragment signal $S_C'$ from a received carrier signal C', and a frequency demultiplexer (164) which operates to separate the spectral fragments $S_0'$, $S_1'$ and $S_2'$ from the combined spectral fragment signal $S_C'$.

Each of the spectral fragments $S_0'$, $S_1'$ and $S_2'$ is coupled to a separate demodulator (i.e., demodulators $162_0$, $162_1$ and $162_2$). Each of the demodulators $162_0$, $162_1$ and $162_2$ demodulates its respective spectral fragments $S_0'$, $S_1'$ and $S_2'$ to provide corresponding demodulated sub-streams $D_0'$, $D_1'$ and $D_2'$.

The demodulated sub-streams $D_0'$, $D_1'$ and $D_2'$ are processed by a combiner 161 to produce an output data stream D' representative of the input data stream D initially processed by the virtual spectrum aggregator transmitter 110. It is noted that each of the demodulators 162 operates in a manner compatible with its corresponding modulator 112.

Optionally, virtual spectrum aggregator receiver 160 includes buffers $166_0$, $166_1$ and $166_2$ which provide an elastic buffering function for the various demodulated sub-streams such that alignment errors induced by different propagation delays associated with the various sub-streams may be avoided prior to combining the sub-streams. The buffers in 166 are depicted as functional elements disposed between the demodulators (162) and combiner 161. In various embodiments, the buffers 166 or their functional equivalent are included within the combiner 161. For example, combiner 161 may include a single buffer which receives data from all of the demodulators (162) and subsequently rearranges that data as output stream D'. Packet ID and/or other information within the sub-streams may be used for this purpose.

Optional control module 170 interacts with an element management system (EMS), a network management system (NMS) and/or other management or control system suitable for use in managing network elements implementing the functions described herein with respect to FIG. 1. The control module 170 may be used to configure various modulators, demodulators and/or other circuitry within the elements described herein with respect FIG. 1. Moreover, the control module 170 may be remotely located with respect to the elements controlled thereby, located proximate transmission circuitry, located proximate receiver circuitry and so on. The control module 170 may be implemented as a general purpose computer programmed to perform specific control functions such as described herein. In one embodiment, control module 170 adapts the configuration and/or operation of the virtual spectrum aggregator transmitter 110 and the virtual spectrum aggregator receiver 160 via, respectively, a first control signal TXCONF and a second control signal RXCONF. In this embodiment, multiple control signals may be provided in the case of multiple transmitters and receivers.

Figure 2:
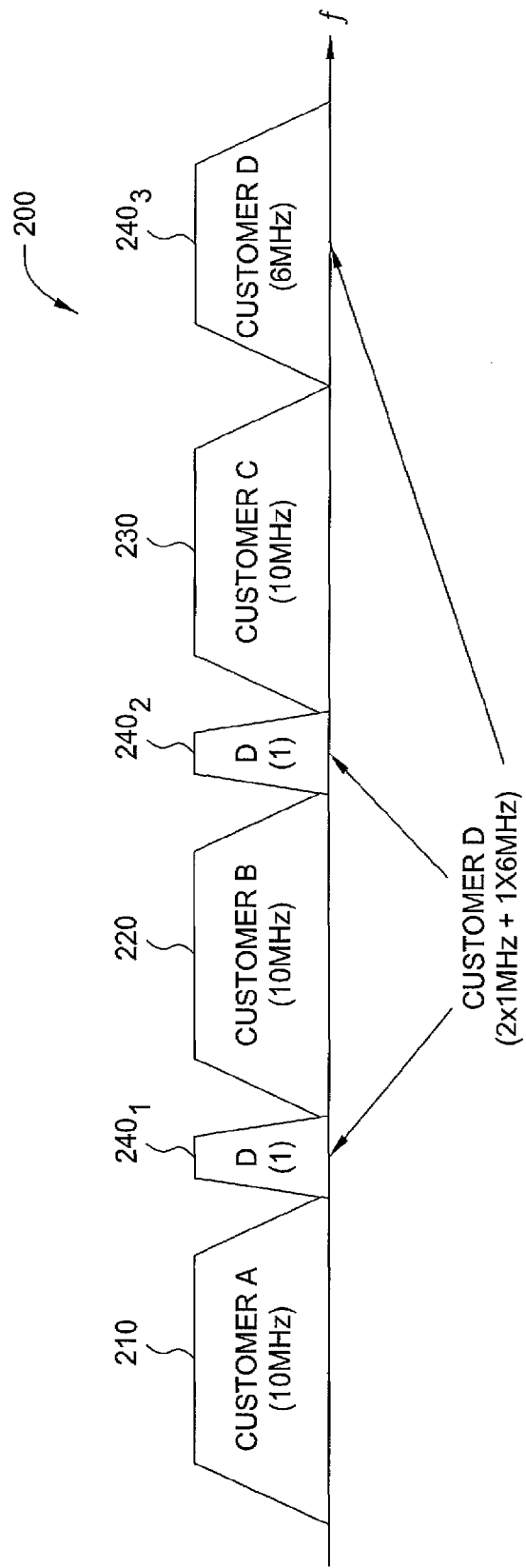
FIG. 2 depicts a graphical representation of a spectral allocation useful in understanding the present embodiments.

FIG. 2 depicts a graphical representation of a spectral allocation useful in understanding the present embodiments. Specifically, FIG. 2 graphically depicts a 36 MHz spectral allocation in which a first customer is allocated a first portion 210 of the spectrum, illustratively a single 10 MHz block; a second customer is allocated a second portion 220 of the spectrum, illustratively single 8 MHz block; a third customer is allocated a third portion 230 of the spectrum, illustratively single 10 MHz block; and a fourth customer is allocated is allocated a fourth portion 240 of the spectrum, illustratively three noncontiguous spectrum blocks comprising a first 1 MHz block $240_1$, a second 1 MHz block $240_1$ and a 6 MHz block $240_3$.

Within the context of the various embodiments discussed herein, the data stream associated with the fourth customer is divided into two different 1 MHz spectral fragments in a single 6 MHz spectral fragment, each of which is processed in substantially the same manner as described above with respect to FIG. 1.

Figure 3:
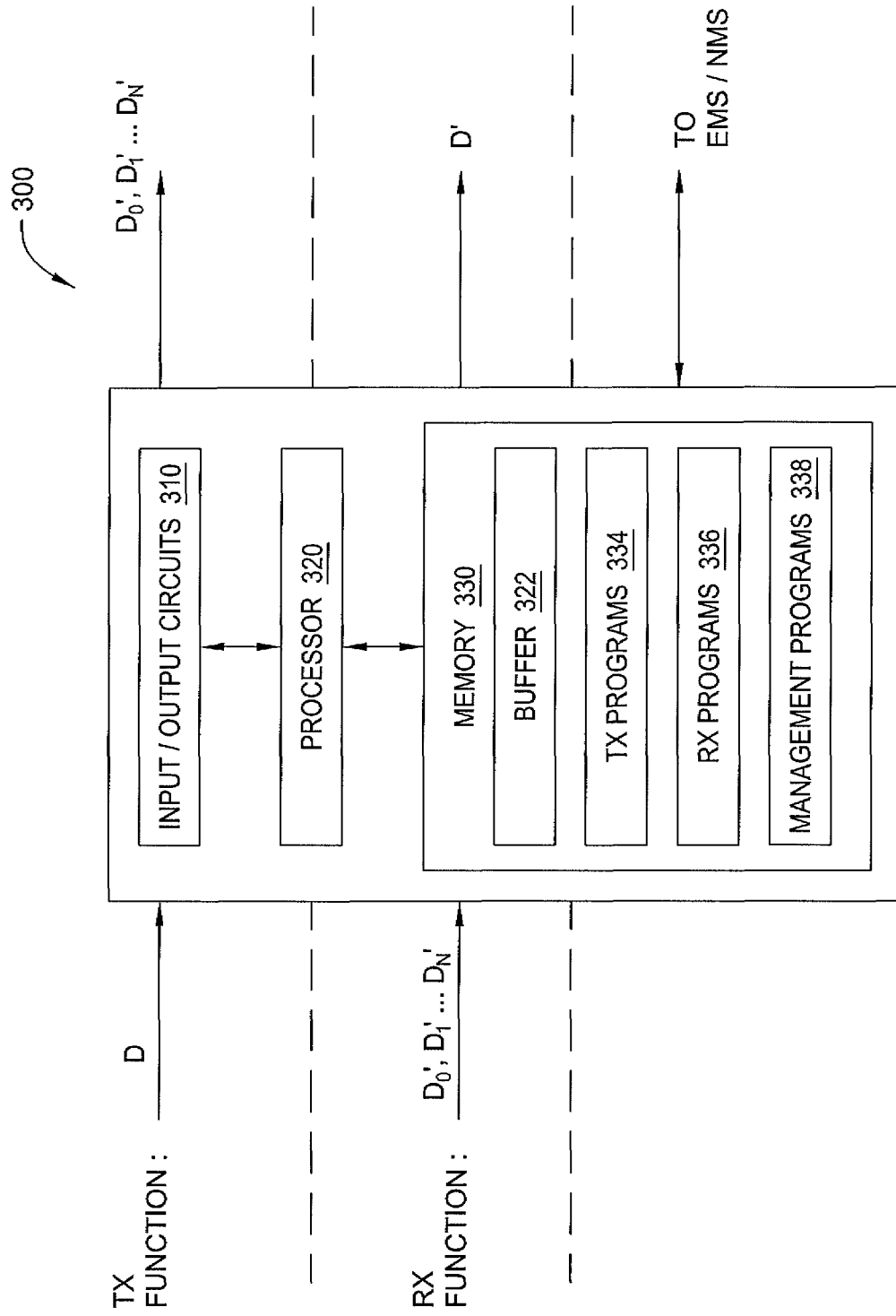
FIG. 3 depicts a high-level block diagram of a general purpose computing device suitable for use in various embodiments.

FIG. 3 depicts a high-level block diagram of a general purpose computing device 300 suitable for use in various embodiments described herein. For example, the computing device 300 depicted in FIG. 3 may be used to execute programs suitable for implementing various transmitter processing functions, receiver processing functions and/or management processing functions as will be described herein.

As depicted in FIG. 3, the computing device 300 includes input/output (I/O) circuitry 310, a processor 320 and memory 330. The processor 320 is coupled to each of the I/O circuitry 310 and memory 330.

The memory 330 is depicted as including buffers 332, transmitter (TX) programs 334, receiver (RX) programs 336 and or management programs 338. The specific programs stored in memory 330 depend upon the function implemented using the computing device 300.

In one embodiment, the slicer/demultiplexer 111 described above with respect to FIG. 1 is implemented using a computing device such as the computing device 300 of FIG. 3. Specifically, the processor 320 executes the various functions described above with respect to the slicer/demultiplexer 111. In this embodiment the I/O circuits 310 receive the input data stream D from a data source (not shown) and provide the N sub-streams ($D_0 \ldots D_{N-1}$) to the demodulators 112.

In one embodiment, the combiner 161 described above with respect to FIG. 1 is implemented using a computing device such as the computing device 300 of FIG. 3. Specifically, the processor 320 executes the various functions described above with respect to the combiner 161. In this embodiment the I/O circuits 310 receive the demodulated sub-streams $D_0'$, $D_1'$ and $D_2'$ from the demodulators 162 (optionally via buffers 166) and provide the output data stream D' representative of the input data stream D initially processed by the virtual spectrum aggregator transmitter 110.

In one embodiment, the optional control module 170 described above with respect to FIG. 1 is implemented using a computing device such as the computing device 300 of FIG. 3.

Although primarily depicted and described as having specific types and arrangements of components, it will be appreciated that any other suitable types and/or arrangements of components may be used for computing device 300. The computing device 300 may be implemented in any manner suitable for implementing the various functions described herein.

It will be appreciated that computer 300 depicted in FIG. 3 provides a general architecture and functionality suitable for implementing functional elements described herein and/or portions of functional elements described herein. Functions depicted and described herein may be implemented in software and/or hardware, e.g., using a general purpose computer, one or more application specific integrated circuits (ASIC), and/or any other hardware equivalents.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, transmitted via tangible media and/or stored within a memory within a computing device operating according to the instructions.

Figure 4:
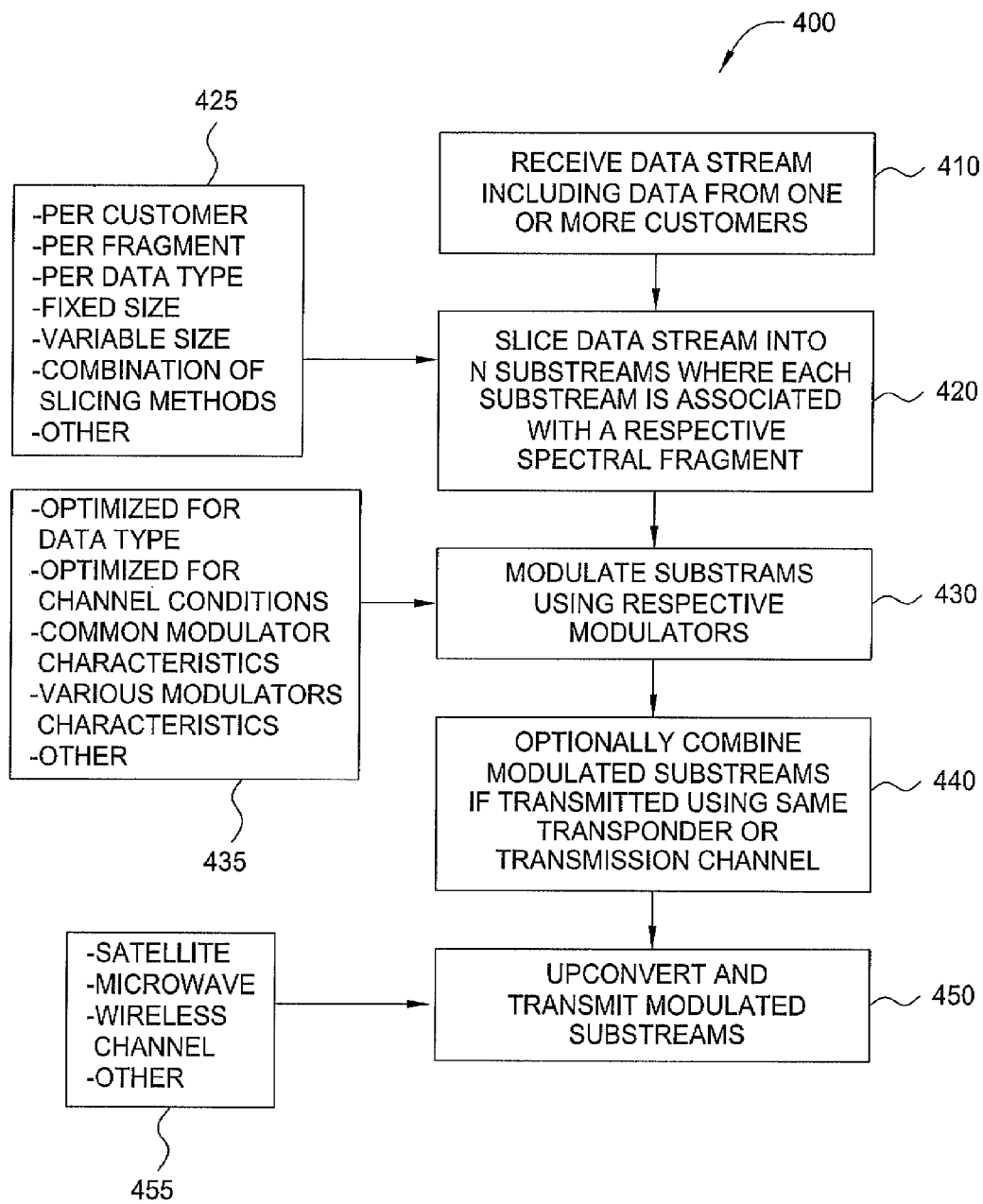
FIGS. 4-6 depicts flow diagrams of methods according to various embodiments.

FIG. 4 depicts a flow diagram of a method according to one embodiment. Specifically, the method 400 of FIG. 4 is suitable for processing a data stream D for transmission, such as described above with respect to FIG. 1.

At step 410, the data stream including data from one or more customers is received, such as by the virtual spectrum aggregated transmitter 110.

At step 420, the received data stream is sliced into N sub-streams, where each sub-streams is associated with a respective spectral fragment. Referring to box 425, the slicing of data streams into sub-streams may be performed using any of the following criteria, alone or in any combination: per customer, per fragment, for data type, fixed size, variable size, combination of various slicing methods and/or other criteria.

At step 430, each of the sub-streams is modulated using a respective modulator. Referring to box 435, demodulators may be optimized for data type, optimized for channel conditions, they share common characteristics, they have various/different characteristics and so on.

At optional step 440, where one or more modulated sub-streams are to be transmitted using the same transponder or transmission channel, these modulated sub-streams are combined.

At step 450, the modulated sub-streams are up converted and transmitted. Referring to box 455, the up conversion/transmission process may be within the context of a satellite communication system, microwave communication system, wireless communication system/channel or other medium.

Figure 5:
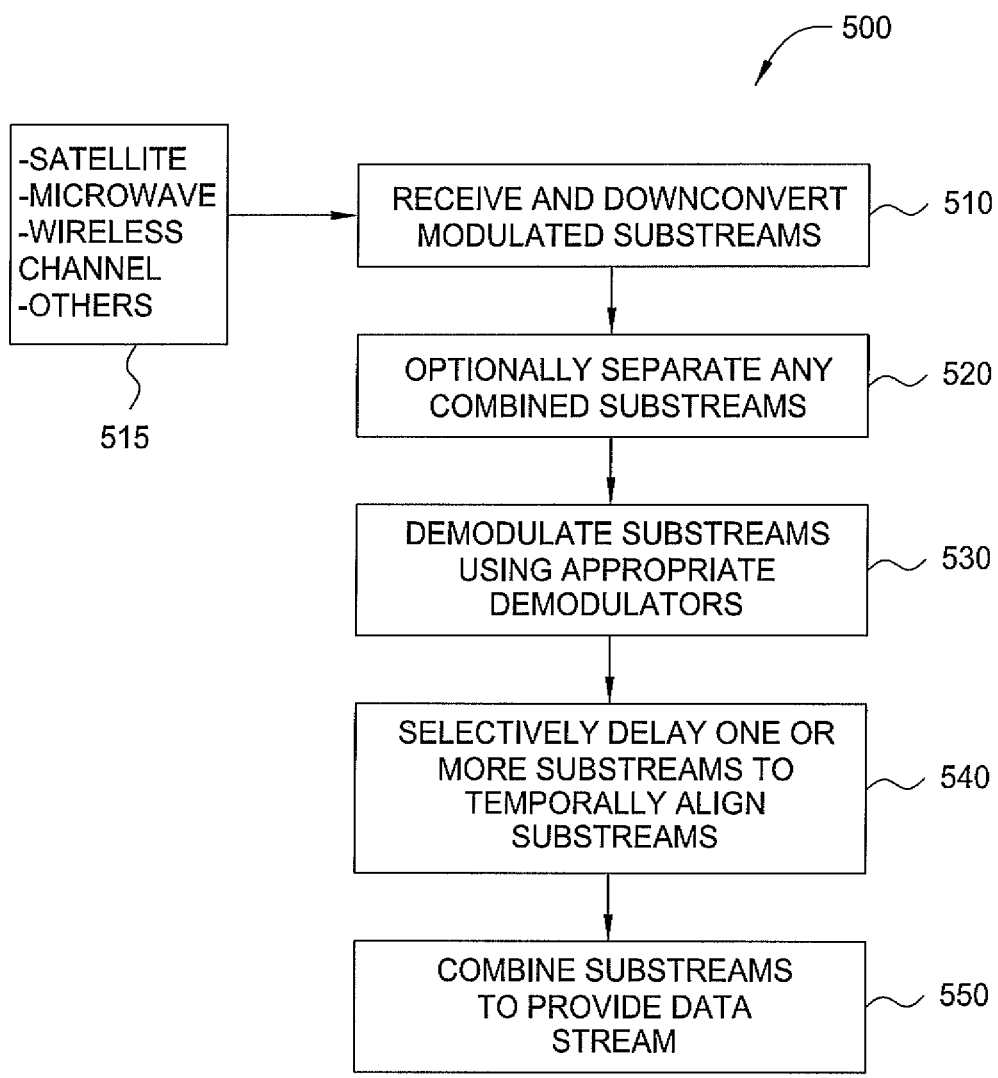

FIG. 5 depicts a flow diagram of a method according to one embodiment. Specifically, the method 500 of FIG. 5 is suitable for processing one or more received sub-streams, such as described above with respect to FIG. 1.

At step 510, one or more modulated sub-streams are received and down converted. Referring to box 515, one or more modulated sub-streams may be received via a satellite communication system, wireless communication system, wireless communication system/channel or other medium.

At step 520, any sub-streams previously combined at the transmitter are separated to provide individual sub-streams, and at step 530 each of the individual sub-streams is demodulated using a respective appropriate demodulator.

At step 540, one or more of the demodulated sub-streams are selectively delayed so that the resulting demodulated data streams may be temporally aligned.

At step 550, the demodulated and selectively delayed sub-streams are combined to provide a resulting data stream such as a data stream D' representative of an input data stream D initially processed by the virtual spectrum aggregator transmitter.

Figure 6:
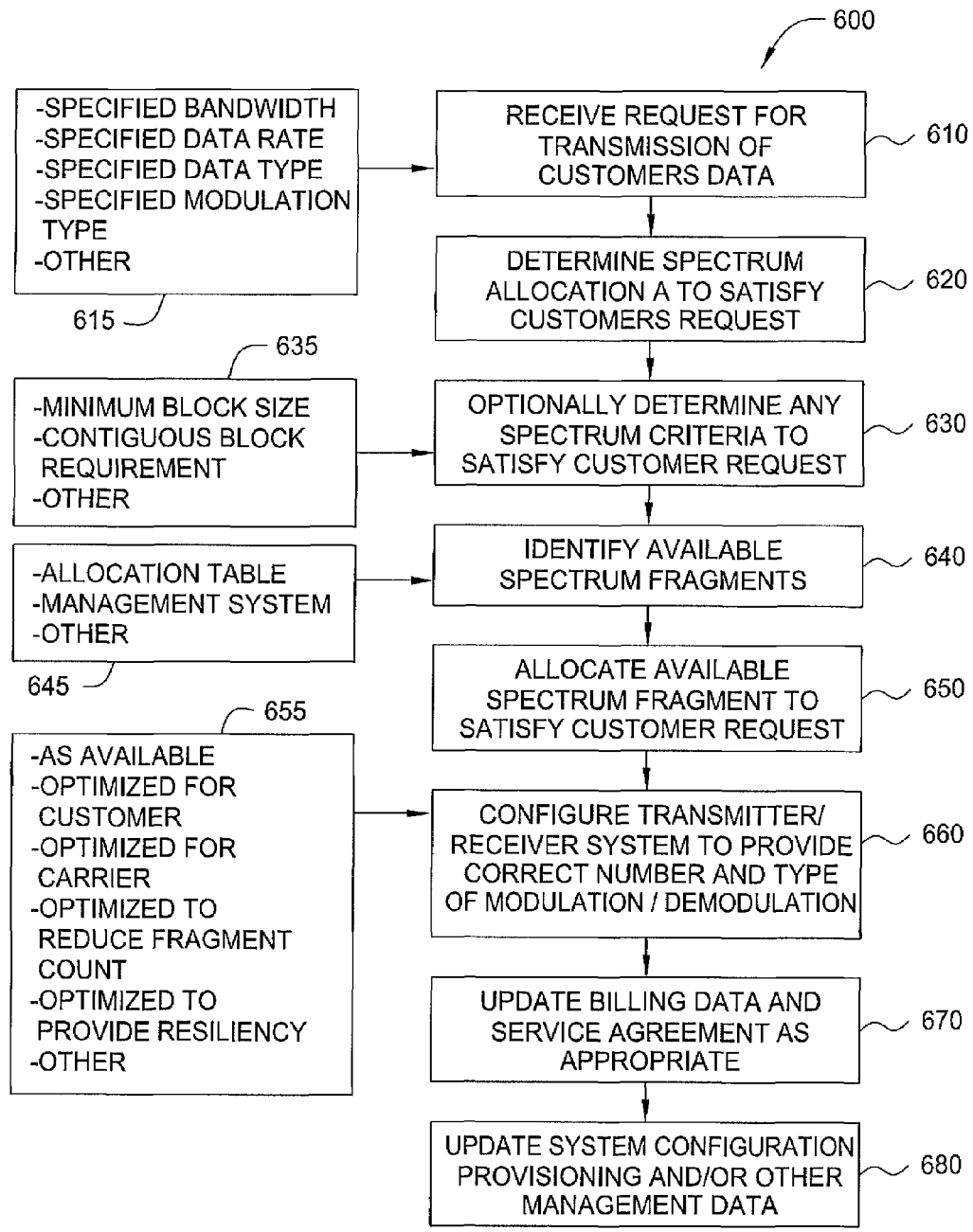

FIG. 6 depicts a flow diagram of a method according to one embodiment. Specifically, the method 600 of FIG. 6 is suitable for configuring various transmitter and receiver parameters in accordance with the various embodiments.

At step 610, a request is received for the transmission of customer data. Referring to box 615, the request may provide a specified bandwidth, a specified data rate, a specified data type, specified modulation type and/or other information describing the bandwidth and/or service requirements associated with the customer data transmission request.

At step 620, a determination is made as to the spectrum allocation suitable for satisfying the customer data transmission request.

At step 630, an optional determination is made as to whether any specific spectrum related criteria is suitable for satisfying the customer data transmission request. Referring to box 635, such spectrum related criteria may include a minimum bandwidth block size, a requirement for contiguous bandwidth blocks and/or other criteria.

At step 640, available spectrum fragments are identified. Referring to box 645, the identification of available spectrum fragments may be made with respect to an allocation table, a management system and/or other source of such information. In one embodiment, an allocation table defines the spectral allocation associated with each customer served by a satellite communications system; namely, the bandwidth allocation of each customer, the transponder(s) supporting the bandwidth, the satellite(s) supporting the transponder(s) and so on. Additionally, available spectrum fragments are defined in terms of size and spectral region for each transponder of each satellite.

At step 650, available spectrum fragments are allocated to satisfy the customer data transmission request. Referring to box 655, the available spectrum fragments may be allocated as available, optimized for the customer, optimized for the carrier, optimized to reduce spectrum fragment count, optimized to provide resiliency or redundancy, and/or optimized based on other criteria.

At step 660, transmitter/receiver systems are configured to provide the correct number and type of modulators/demodulators to support the customer data transmission request and adapt to any changes to spectrum fragment allocations for the requesting customer and/or other customers. That is, based upon optimization and/or other criteria, it may be appropriate to modify the spectral fragment allocations of multiple customers to optimize in favor of a particular customer, service provider and the like.

At step 670, billing data, service agreements and the like are updated as appropriate. At step 680, system configuration, provisioning and/or other management data is updated.

In various embodiments, spectral fragment available on different satellite transponders and/or different satellites are aggregated to form a virtual contiguous block. In other embodiments, the entire bandwidth of multiple transponders is used to support high data-rate pipes (e.g., OC-3/12c) over satellite links.

FIGS. 7-9 depict block diagrams of communication systems according to various embodiments. Each of the various components within the communication systems depicted in FIGS. 7-9 operates in substantially the same manner as described above with respect to corresponding components within the communication system of FIG. 1. For example, in each of the embodiments of FIGS. 7-9, an input data stream D is received by a virtual spectrum aggregated transmitter 110, where it is processed by a slicer/de-multiplexer x11 to provide N sub-streams ($D_0 \ldots D_{N-1}$), where each of the N sub-streams is modulated by respective modulator x12. Other differences and similarities between the various figures will now be described more detail.

Figure 7A:
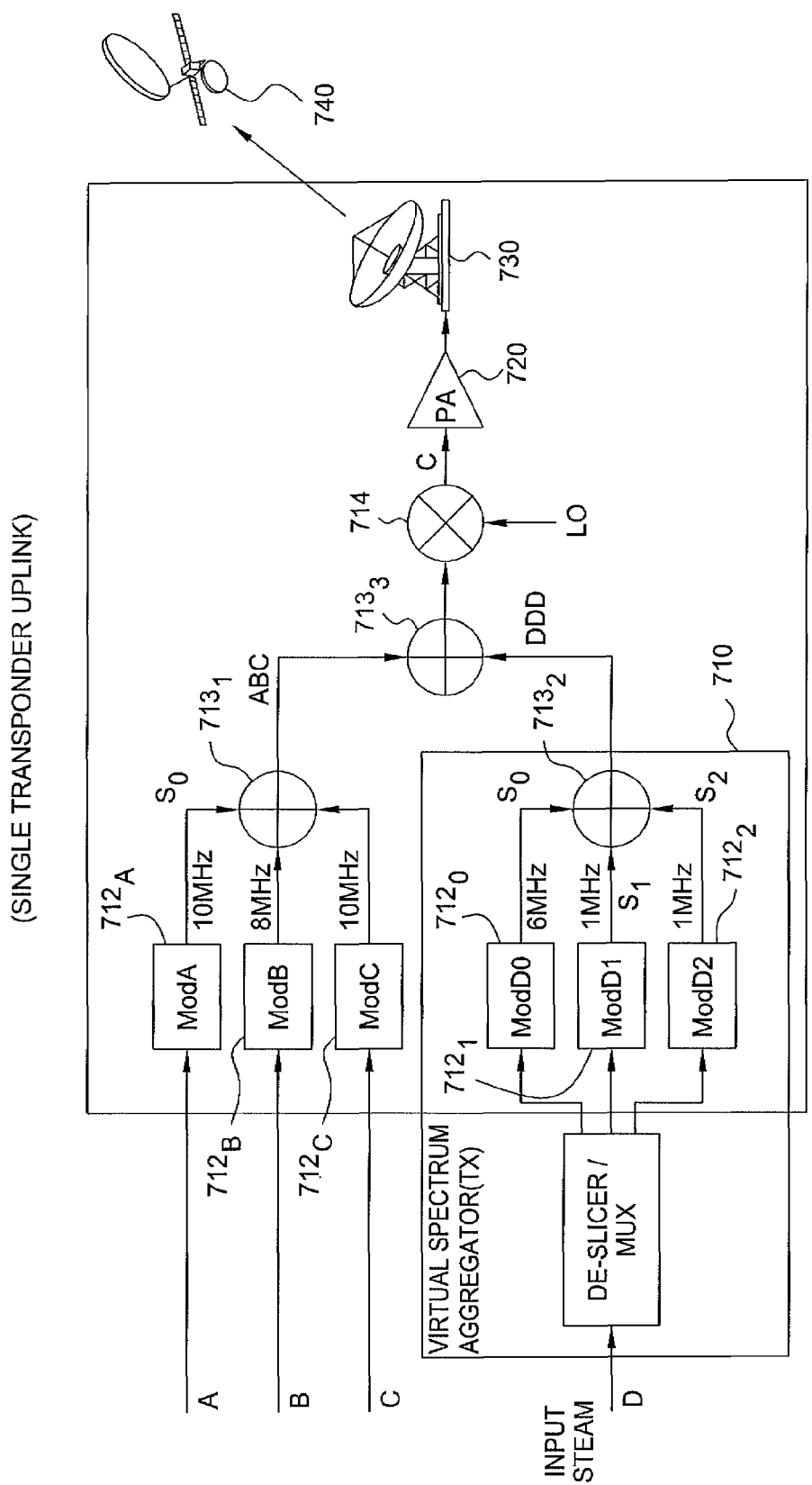
FIGS. 7-9 depicts block diagrams of communication systems according to various embodiments.
Figure 7B:
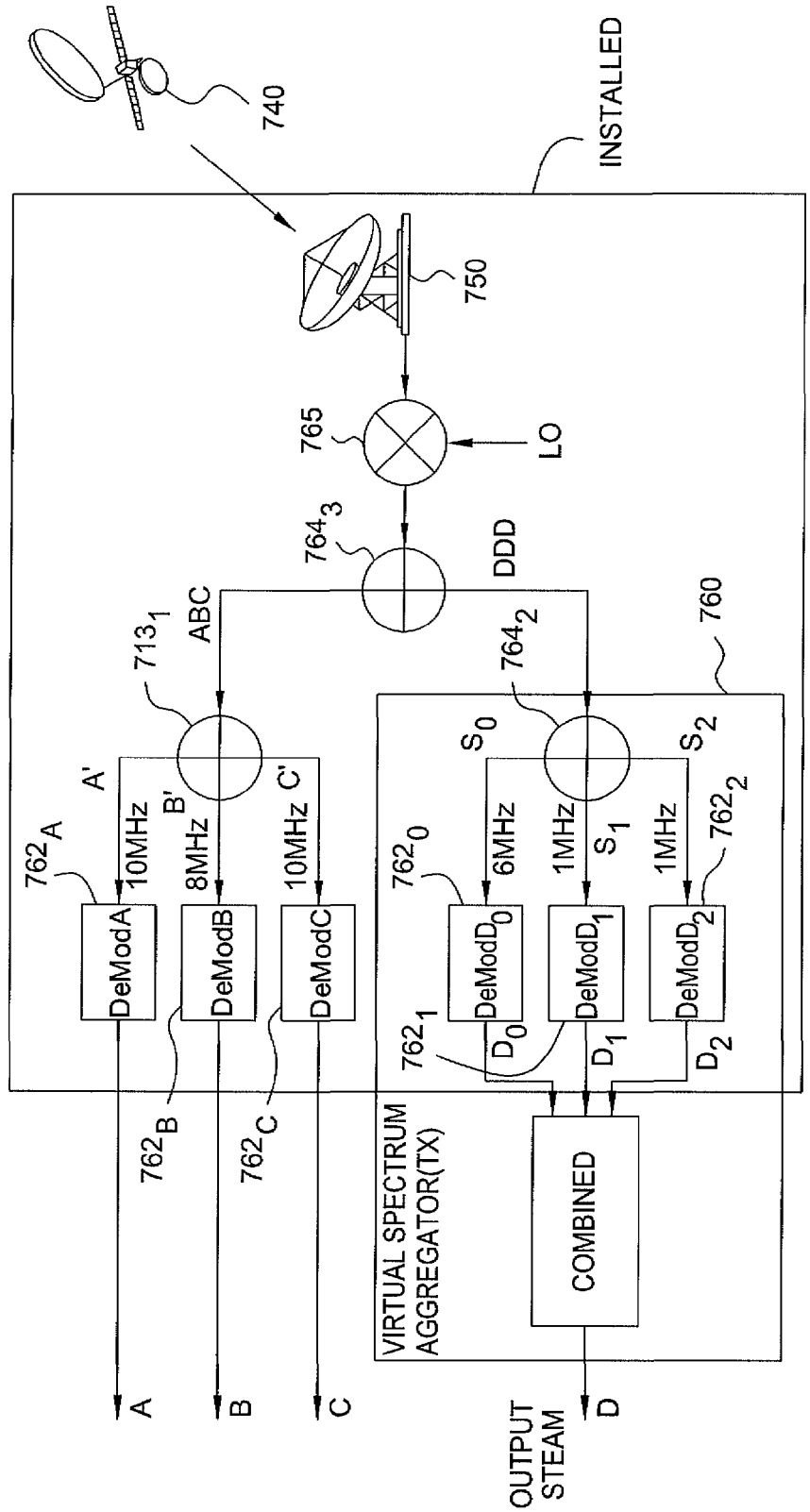

FIG. 7 depicts a single transponder embodiment in which a single transponder is used to transport each of a plurality of data streams denoted as streams A, B, C and D. FIG. 7A depicts an uplink portion of the system, while FIG. 7B depicts a downlink portion of the system.

Referring to FIG. 7A, data streams A, B and C are modulated by respective modulators 712 to produce respective modulated streams which are then combined by a first signal combiner $113_1$ to provide a combined modulated signal ABC.

Data stream D is processed by a slicer/de-multiplexer 711 to provide N sub-streams ($D_0 \ldots D_{N-1}$) which are then modulated by respective modulators 712 (i.e., modulators $712_0$, $712_1$ and $712_2$) to provide corresponding modulated signals to be carried by respective spectral fragments $S_0$, $S_1$ and $S_2$. The corresponding modulated signals are combined by a second signal combiner $713_2$ to provide a combined modulated signal DDD, which is combined with modulated signal ABC by a third signal combiner $713_3$. The resulting combined modulated signals are converted by an up converter 714 to produce a carrier signal C which is amplified by a power amplifier 720 and transmitted towards a satellite 740 via a satellite uplink 730.

Referring to FIG. 7B, satellite 740 transmits a modulated carrier signal including the modulated streams A through D to satellite downlink 750, which propagates the signal to a down-converter, 765. The down-converted signal is processed by a frequency de-multiplexer $164_3$ which operates to separate the signal into the ABC and DDD signal components.

The ABC signal components are separated by a second frequency de-multiplexer $764_1$ to recover the modulated signals and then demodulated by respective demodulators 752.

The DDD signal components are separated by a third frequency de-multiplexer $764_2$ to recover the modulated signals which are demodulated by respective demodulators 752.

The demodulated sub-streams $D_0'$, $D_1'$ and $D_2'$ are processed by a combiner 761 to produce an output data stream D' representative of the input data stream D. It is noted that each of the demodulators 162 operates in a manner compatible with its corresponding modulator 112.

Figure 8A:
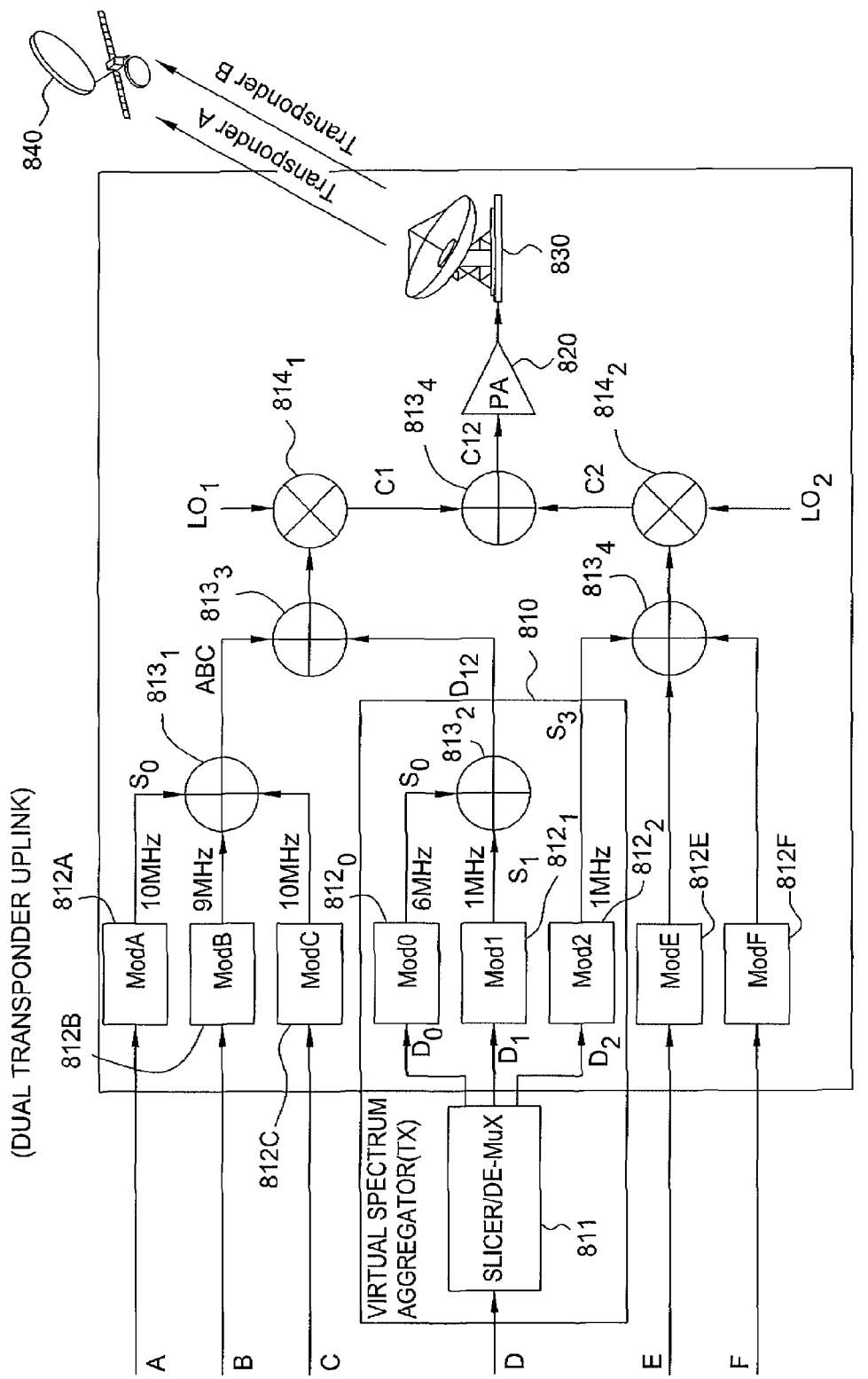
Figure 8B:
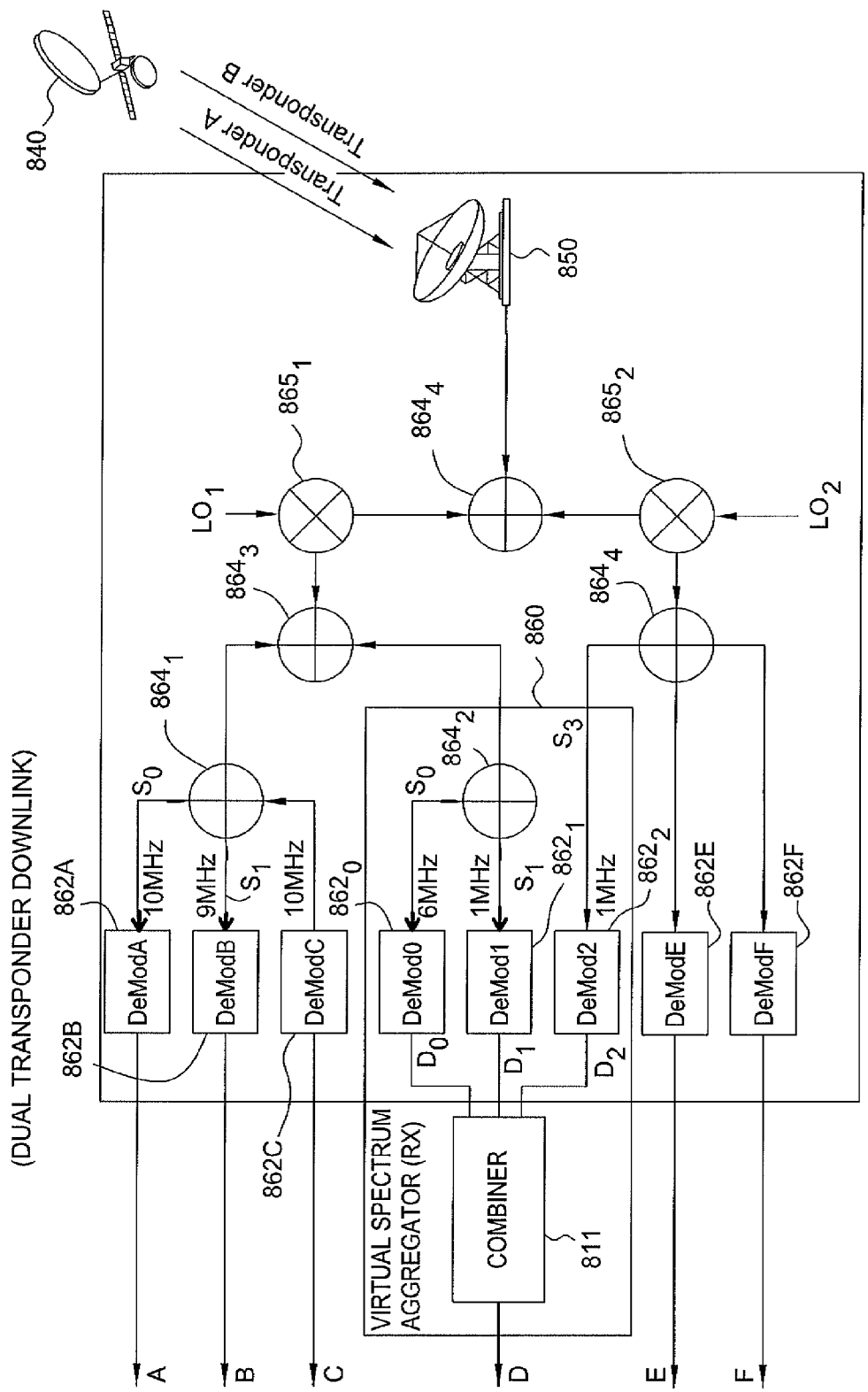

FIG. 8 depicts a dual transponder embodiment in which a first transponder is used to transport each of a plurality of data streams denoted as streams A, B, and C, as well as two of three sub-streams associated with a data stream D, while a second transponder is used to transport each of a plurality of data stream denoted as E and F, as well as the third sub-stream associated with the data stream D. FIG. 8A depicts an uplink portion of the system, while FIG. 8B depicts a downlink portion of the system.

Referring to FIG. 8A, data streams A, B, C, E and F are modulated by respective modulators 812 to produce respective modulated streams.

Data streams E and F are modulated by respective modulators 812 to produce respective modulated signals.

Data stream D is processed by a slicer/de-multiplexer 711 to provide N sub-streams ($D_0 \ldots D_{N-1}$) which are then modulated by respective modulators 712 (i.e., modulators $712_0$, $712_1$ and $712_2$) to provide corresponding modulated signals to be carried by respective spectral fragments $S_0$, $S_1$ and $S_2$.

The modulated signals associated with data streams A, B and C are combined by a first signal combiner $813_1$ to provide a combined modulated signal ABC.

The modulated signals associated with sub-streams $D_0$ and $D_1$ are combined by a second signal combiner $813_2$ to provide a combined modulated signal $D_{12}$.

The combined modulated signals produced by the first $813_1$ and second $813_2$ signal combiners are then combined by a third signal combiner $813_3$ and converted by a first upconverter $814_1$ to produce a first carrier signal C1.

The modulated signals associated with sub-stream $D_3$ and streams E and F are combined by a fourth signal combiner $813_3$ and converted by a second upconverter $814_2$ to produce a second carrier signal C2.

The C1 and C2 carrier signals are combined by a fourth signal combiner, $813_4$, amplified by a power amplifier, 820, and transmitted towards a satellite, 840, via respective transponders (A and B) of a satellite uplink 830.

Referring to FIG. 8B, satellite 840 transmits the two modulated carrier signals including the modulated streams A through F via respective transponders (A and B) to satellite downlink 850, which propagates the signal to a downconverter 865. The down-converted signal is separated into its two carrier signals by frequency demultiplexer $864_4$. The two carrier signals are processed using various demultiplexers in 864, demodulators in 862 and combiner 861 to produce the various output data streams A' through F' representative of the input data stream A through F.

Figure 9A:
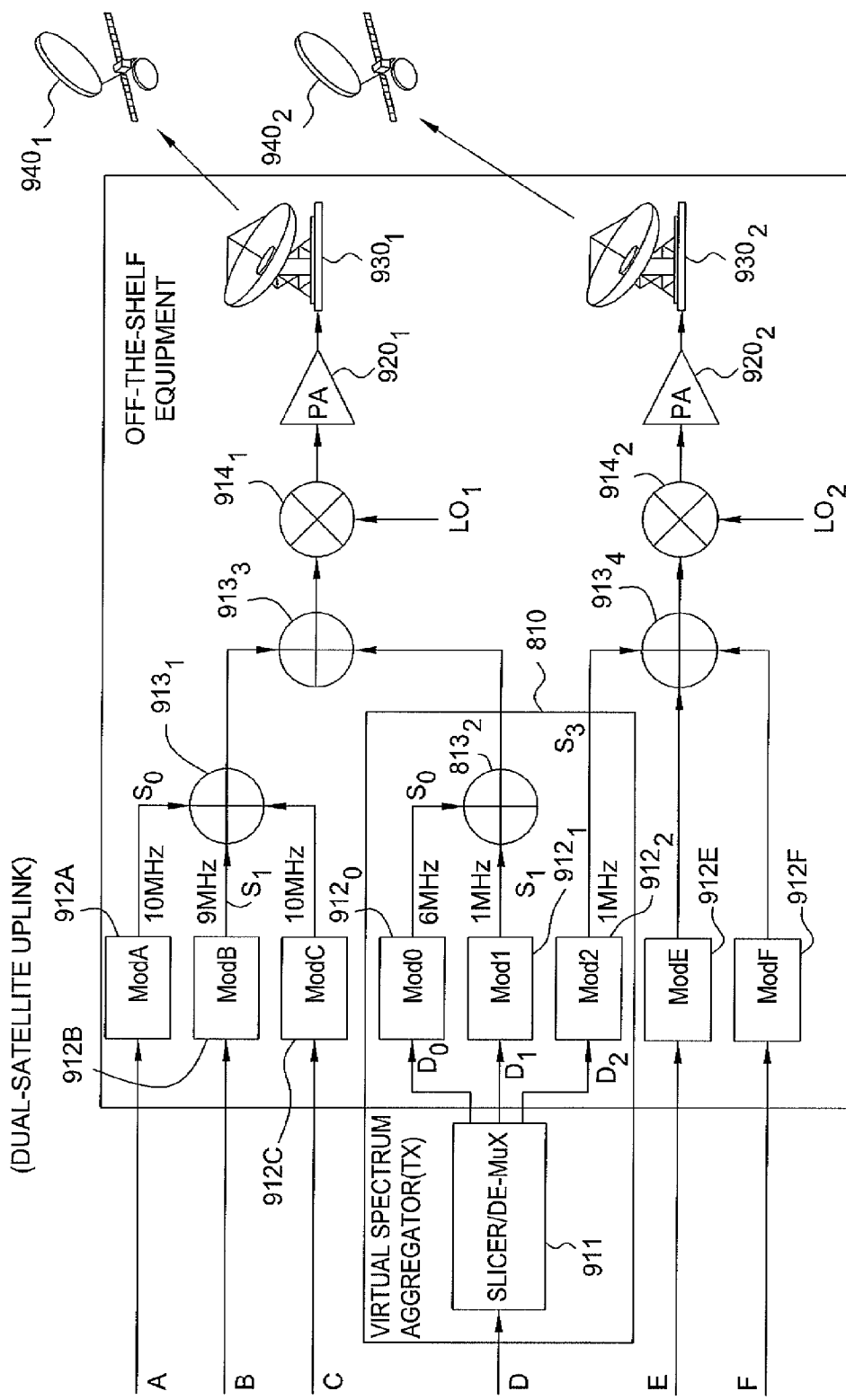
Figure 9B:
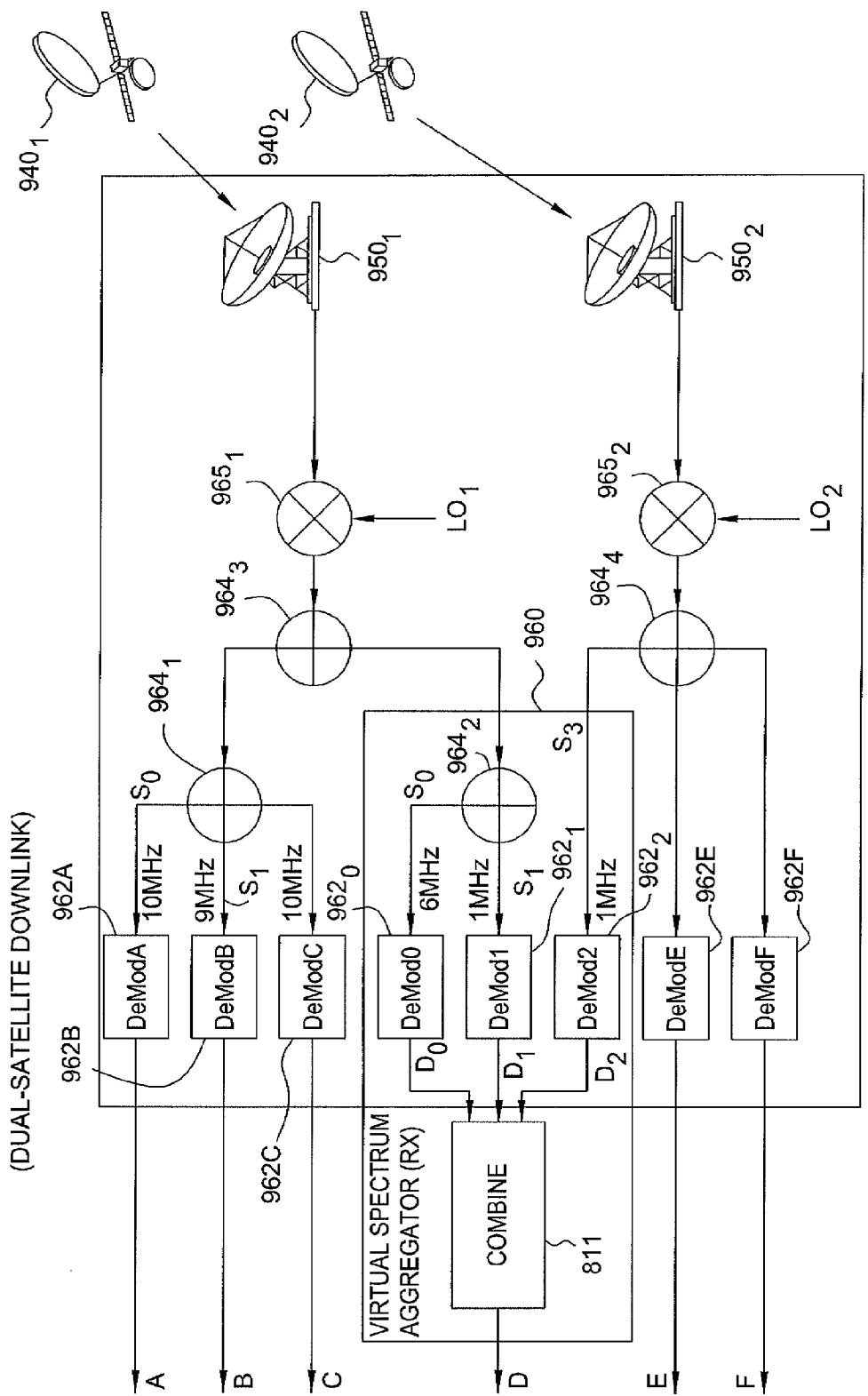

FIG. 9 depicts a dual satellite embodiment in which one satellite ($940_1$) is used to transport a plurality of data streams denoted as streams A, B, and C, as well as two of the three sub-streams associated with data stream D. A second satellite ($940_2$) is used to transport a plurality of data streams denoted E and F as well as the third sub-stream associated with data-stream D. FIG. 9A depicts an uplink portion of the system while FIG. 9B depicts a downlink portion of the system.

Referring to FIG. 9A, data streams A, B, C, E and F are processed in substantially the same manner as described above with respect to FIG. 8A, except that the two carrier signals are not combined for transport via respective transponders of a single satellite. Rather, FIG. 9 shows two carrier signals amplified by separate power amplifiers ($920_1$ and $920_2$) and transmitted to satellites $940_1$ and $940_2$, respectively, using uplinks $930_1$ and $930_2$.

Referring to FIG. 9B, the two satellites 940 transmit their respective modulated carrier signals including modulated streams A through F via respective downlinks 950, which are then fed to respective down-converters 965. The two down-converted carrier signals are processed using de-multiplexers (964), demodulators (962) and a combiner (961) to produce the output data streams A' through F' representative of the input data streams A through F.

Figure 10:
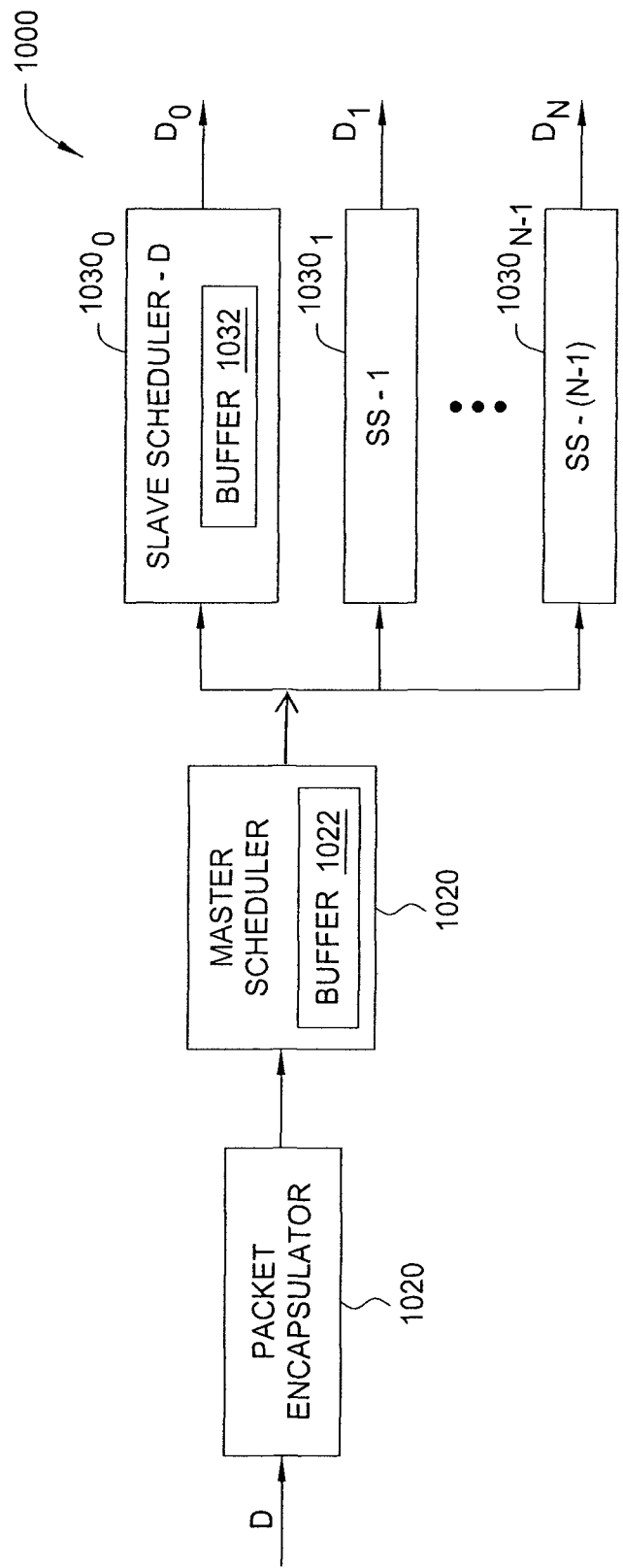
FIG. 10 depicts a high-level block diagram of a slicer/de-multiplexer suitable for use in various embodiments.

FIG. 10 depicts a high-level block diagram of a slicer/de-multiplexer suitable for use in the various embodiments described herein. Specifically, the slicer/de-multiplexer 1000 of FIG. 10 comprises a packet encapsulator 1010, a master scheduler 1020 including a buffer memory 1022, and a plurality of slave schedulers 1030 including buffer memories 1032.

The packet encapsulator 1010 operates to encapsulate packets received from data-stream D into a packet structure having a predefined or normalized format. While various encapsulating packet formats may be used, it is important that the combiner at a downlink side of a system be configured to combine packets according to the encapsulating format used by the slicer/de-multiplexer at an uplink side of the system.

In one embodiment, encapsulating packets comprise 188 byte packets having a 185-byte payload section and a three-byte header section. The packet encapsulator 1010 extracts a sequence of 185 byte portions from the original data stream D, and encapsulates each extracted portion to form encapsulating packet (EP). The header portion of each encapsulating packet stores a user sequence number associated with payload data such that the sequence of 185 byte portions of the data stream may be reconstructed by a combiner, such as described above with respect to the various figures.

In one embodiment, the user sequence number comprises a 14-bit number that is continually incremented and used to stamp encapsulated packets provided by the packet encapsulator 1010. In one embodiment, the header portion of the packet provided by the packet encapsulator 1010 comprises a first byte storing 47 hexadecimal (i.e. 47 h), followed by 2 zero bits, followed by 14 bits associated with the user sequence number.

A larger sequence number field (e.g., 24 or 32 bits) may be used when the aggregate data rate being transported is higher. The size of the sequence number field is related to the amount of buffering that takes place at the receiving combiner element described in various figures above. The size of the buffer, in turn, is related to the ratio of the largest sub-stream bandwidth to the smallest sub-stream bandwidth. Thus, various embodiments may adjust the sequence number field size (and the resulting overhead) based on total aggregate bandwidth and/or the ratio of the highest to smallest bandwidth sub-streams.

In various embodiments, more or fewer than 188 bytes are used to construct encapsulating packets. In various embodiments, more or fewer than three bytes are used to construct encapsulating packet headers. For example, by allocating additional header bits to the user sequence number a larger user sequence number may be used. In this case, the likelihood of processing at a receiver two encapsulating packets having the same sequence is reduced.

In the embodiments described herein, the fixed packet size of 188 bytes is used for the encapsulating packets. However, in various alternate embodiments different fixed-sized packets and/or different variable sized packets may be used for different sub-streams as long as such packet sizes are compatible with the input interfaces of the respective modulators used for those sub-streams.

The master scheduler 1020 routes encapsulated packets to the various slave schedulers 1030. The slave schedulers 1030 in turn route their packets to respective output ports of the slicer/demultiplexer, thereby providing respective substreams to, illustratively, modulators or other components.

Generally speaking, each slave scheduler 1030 accepts packets conforming to the bandwidth of the spectral fragment assigned to that scheduler. Thus, the slave scheduler servicing a 1 MHz spectral fragment channel accepts packets at a data rate approximately 1/10 that of a slave scheduler serving a 10 MHz spectral fragment or region.

The master scheduler 1020 communicates with the slave schedulers 1030 to identify which slave scheduler 1030 is (or should be) capable of receiving the next encapsulated packet. Optionally, the master scheduler 1020 receives status and other management information from the slave schedulers 1030, and some of this status information may be propagated to various management entities (not shown).

In one embodiment, the slave schedulers 1030 provide a control signal to the master scheduler 1020 indicative of an ability to accept the packet. In one embodiment, the master scheduler 1020 allocates packets to the slave schedulers 1030 in a round robin fashion. In one embodiment, where certain transmission channels or spectral regions are preferred based upon customer and/or service provider requirements, the allocation of encapsulated packet by the master scheduler 1020 is weighted in favor of providing more encapsulated packets to those slave schedulers 1030 servicing the preferred transmission channels.

In one embodiment, each of the slave schedulers is associated with a predefined bandwidth or other indicators of channel capacity associated with the corresponding spectral fragment. In this embodiment, the master scheduler 1020 routes packets according to a weighting assignment for each slave scheduler 1030.

Generally speaking, the master scheduler routes packets according to one or more of a random routing algorithm, a round robin routing algorithm, a customer preference algorithm and a service provider preference algorithm. Such routing may be accommodated by associating a weighting factor with each modulator, spectral fragment, communications channel (e.g., transponder, microwave links, wireless channel etc.) and so on. For example, a preferred spectral fragment may comprise a fragment having a minimum or maximum size, a fragment associated with a relatively low error or relatively high error channel, a fragment associated with a preferred communications type (e.g., satellite, microwave link, wireless network and so on), a fragment associated with a preferred customer and the like. Other means of weighting channels, communication systems, spectral regions and so on may also be used within the context of the various embodiments.

Figure 11:
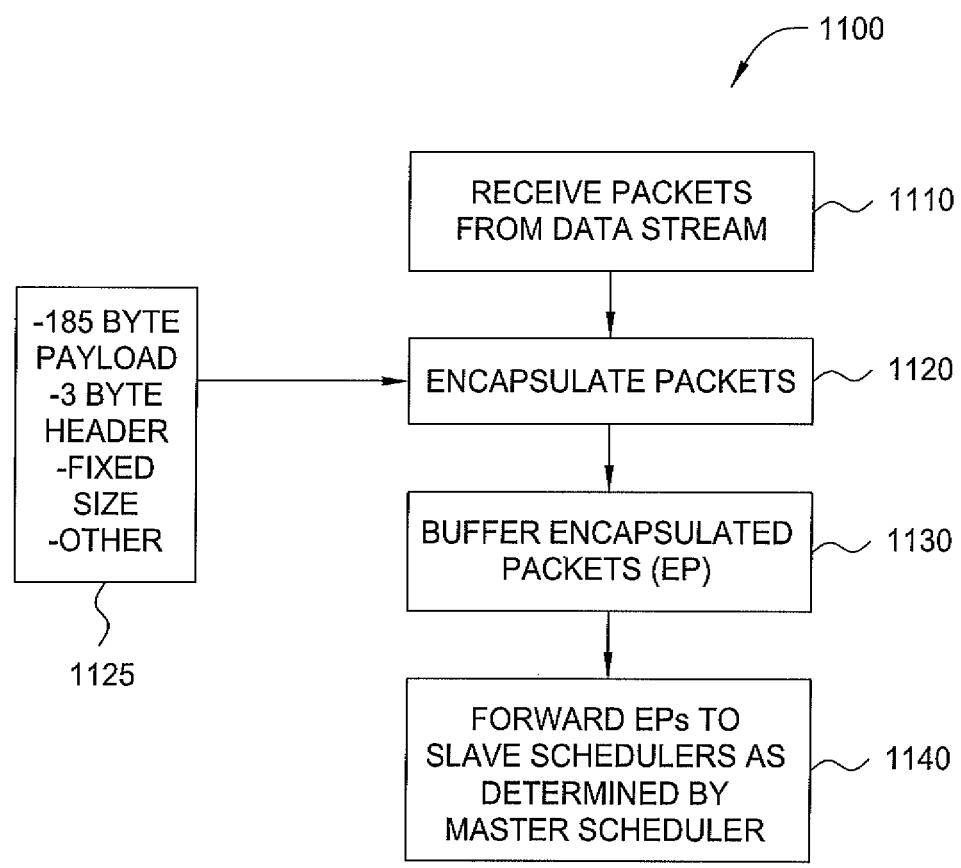
FIG. 11 depicts a flow diagram of a method according to one embodiment.

FIG. 11 depicts a flow diagram of a method according to one embodiment. At step 1110, packets are received from data stream D. At step 1120, received packets are encapsulated. Referring to box 1125, the packet may comprise 185 byte payload and three byte header packets. Other header formats with a different sequence number field size and/or additional control information may be used within the context of the present embodiments.

At step 1130 the encapsulated packets are buffered by, illustratively, the master scheduler 1020, a separate buffer (not shown) within the packet encapsulator 1010 and so on.

At step 1140, encapsulator packets are forwarded (or caused to be forwarded) to the slave schedulers 1030 by the master scheduler 1020.

In the various embodiments described herein, each encapsulated packet is coupled to a respective modulator as part of a respective sub-stream. However, in embodiments adapted to provide increased data resiliency and/or backup, encapsulated packets may be coupled to multiple modulators as part of multiple respective sub-streams. In these embodiments, the sequence number associated with the encapsulated packet remains the same.

In these embodiments, a receiver will process the first encapsulated packet (or error-free encapsulated packet) having the appropriate sequence number and ignore other packets having the same sequence number. That is, when re-ordering encapsulating packets at the receiver, those encapsulating packets having a sequence number matching a sequence number of a recently ordered encapsulating packet are discarded. Since sequence numbers are cyclical or repeated (e.g., every 16,384 encapsulating packets in the case of a 14-bit sequence number), an encapsulating packet having the same sequence number of encapsulating packet processed several thousand packets ago is likely a duplicate of that previously processed encapsulating packet and, therefore, should be dropped or discarded as being redundant.

Various embodiments described herein provide dynamic spectrum aggregation of disjoint blocks of spectrum such that spectrum may be added to or subtracted from existing spectrum allocations as customer bandwidth requirements change. Additionally, small or orphaned spectrum blocks (i.e., those spectrum blocks too small to generally be useful) may be virtually combined to form larger blocks of bandwidth.

The above-described embodiments provide a number of advantages, including improved system resiliency since the loss of any one spectral fragment will likely not cause a complete loss of service. In addition, when spectral fragments are mapped across multiple transponders, the loss of any one transponder does not result in a complete loss of service; rather, a graceful degradation of service is provided. Older/existing schemes utilizing contiguous spectrum are capable of using only one transponder which becomes a potential single point of failure.

Various benefits of the embodiments include significantly higher spectral usage efficiency as well as the ability to use orphaned spectral fragments that are too small to use otherwise. The various embodiments are applicable to satellite applications, point-to-point wireless links such as those used in bent-pipe SatCom applications, wireless backhaul infrastructure such as provided using microwave towers and so on.

The various embodiments provide a mechanism wherein bandwidth may be allocated by "appending" additional blocks of bandwidth to those bandwidth blocks already in use, thereby facilitating a "pay-as-you-grow" business model for service providers and consumers.

In various embodiments, a single transponder in a satellite system is used to propagate a carrier signal including a plurality of modulated sub-streams, each of the modulated sub-streams occupying its respective spectral fragment region. In other embodiments, multiple carrier signals are propagated via respective transponders.

In various embodiments, a single microwave link within a microwave communication system is used to propagate a carrier signal including a plurality of modulated sub-streams, each modulated sub-stream occupying its respective spectral fragment region. In other embodiments, multiple carrier signals are propagated via respective microwave links.

In various embodiments, a single wireless channel within a wireless communication system is used to propagate a carrier signal including a plurality of modulated sub-streams, each modulated sub-stream occupying its respective spectral fragment region. In other embodiments, multiple carrier signals are propagated via respective wireless channels.

While the foregoing is directed to various embodiments of the present invention, other and further embodiments of the invention may be devised without departing from the basic scope thereof and those skilled in the art can readily devise many other varied embodiments that still incorporate these teachings. As such, the appropriate scope of the invention is to be determined according to the claims, which follow.

What is claimed is:

1. A method, comprising:
   receiving a customer data transmission request for a data stream to be transmitted, the customer data transmission request comprising customer criteria including a bandwidth of the data stream to be transmitted;
   obtaining a spectrum-related parameter associated with the customer data transmission request;
   identifying a set of available spectral fragments, each of the available spectral fragments being defined by a respective bandwidth size, at least two of the available spectral fragments being separated by an allocated spectral region, at least two of the available spectral fragments having different bandwidth sizes;
   allocating at least two of the available spectral fragments for the data stream, based on the customer criteria of the customer data transmission request and the spectrum-related parameter associated with the customer data transmission request, to provide a set of allocated spectral fragments for the data stream, the allocated spectral fragments having a combined bandwidth sufficient to support the bandwidth of the data stream, at least two of the allocated spectral fragments being separated by an allocated spectral region, at least two of the allocated spectral fragments having different bandwidth sizes;
   dividing the data stream into a set of output sub-streams, the output sub-streams being associated with respective ones of the allocated spectral fragments and having respective data rates compatible with the respective bandwidth sizes of the respective allocated spectral fragments;
   modulating the output sub-streams to provide respective modulated signals adapted for transmission via the respective allocated spectral fragments; and
   upconverting the modulated signals onto the respective allocated spectral fragments.

2. The method of claim 1, further comprising:
   combining at least two modulated signals to form a combined modulated signal; and
   upconverting the combined modulated signal onto the allocated spectral fragments.

3. The method of claim 1, wherein the modulated signals are upconverted onto at least two carrier signals.

4. The method of claim 3, wherein each of the at least two carrier signals is supported by a respective transponder within a satellite communications system.

5. The method of claim 3, wherein each of the at least two carrier signals is supported by a respective microwave link within a microwave communications system.

6. The method of claim 3, wherein each of the at least two carrier signals is supported by a respective wireless channel within a wireless communications system.

7. The method of claim 1, wherein dividing the data stream into the set of output sub-streams comprises:
   encapsulating sequential portions of the data stream into payload portions of respective encapsulating packets, each of the sequential portions of the data stream being associated with a respective sequence number included within a header portion of the respective encapsulating packet; and
   including each encapsulating packet within a respective one of the output sub-streams.

8. The method of claim 1, wherein dividing the data stream into the set of output sub-streams comprises:
   encapsulating sequential portions of the data stream into payload portions of respective encapsulating packets, each of the sequential portions of the incoming data stream being associated with a respective sequence number included within a header portion of the respective encapsulating packet; and
   including each encapsulating packet within one or more of the output sub-streams.

9. The method of claim 7, wherein the sequence number is represented by a field having at least 14 bits.

10. The method of claim 7, wherein the encapsulating packet header further includes a hexadecimal 47 in a first byte.

11. The method of claim 1, further comprising:
    receiving each of the modulated signals via the respective allocated spectral fragments;
    demodulating each of the modulated signals to provide respective demodulated sub-streams corresponding to the respective output sub-streams; and
    combining the demodulated sub-streams to recover the data stream.

12. The method of claim 11, wherein combining the demodulated sub-streams to recover the data stream comprises:
    ordering encapsulating packets received via one or more demodulated sub-streams, according to respective sequence numbers of the encapsulating packets, to provide ordered encapsulating packets; and
    extracting sequential portions of the data stream from the ordered encapsulating packets to recover thereby the data stream.

13. The method of claim 12, further comprising:
    discarding encapsulating packets having a sequence number matching the sequence number of a recently received encapsulating packet.

14. Apparatus, comprising: a computer configured to:
    receive a customer data transmission request for a data stream to be transmitted, the customer data transmission request comprising customer criteria including a bandwidth of the data stream to be transmitted;
    obtain a spectrum-related parameter associated with the customer data transmission request;
    identify a set of available spectral fragments, each of the available spectral fragments being defined by a respective bandwidth size, at least two of the available spectral fragments being separated by an allocated spectral region, at least two of the available spectral fragments having different bandwidth sizes; and
    allocate at least two of the available spectral fragments for the data stream, based on the customer criteria of the customer data transmission request and the spectrum-related parameter associated with the customer data transmission request, to provide a set of allocated spectral fragments for the data stream, the allocated spectral fragments having a combined bandwidth sufficient to support the bandwidth of the data stream, at least two of the allocated spectral fragments being separated by an allocated spectral region, at least two of the allocated spectral fragments having different bandwidth sizes;
a sputter configured to divide the data stream into a set of output sub-streams, the output sub-streams being associated with respective ones of the allocated spectral fragments and having respective data rates compatible with the respective bandwidth sizes of the respective allocated spectral fragments;
a set of modulators configured to modulate the respective output sub-streams to provide respective modulated signals adapted for transmission via the respective allocated spectral fragments; and
at least one upconverter configured to upconvert the modulated signals onto the respective allocated spectral fragments.

15. The apparatus of claim 14, wherein the splitter comprises:
an encapsulator configured to encapsulate sequential portions of the data stream into payload portions of respective encapsulating packets, each of the sequential portions of the data stream being associated with a respective sequence number included within a respective header portion of the respective encapsulating packet; and
a master scheduler configured to selectively route encapsulating packets toward the modulators.

16. The apparatus of claim 15, wherein the splitter further comprises:
a set of sub-schedulers configured to route encapsulating packets received from the master scheduler toward a respective modulator.

17. The apparatus of claim 15, wherein the master scheduler is configured to route encapsulating packets according to one of a random routing algorithm and a round robin routing algorithm.

18. The apparatus of claim 15, the master scheduler is configured to route encapsulating packets according to one of a customer preference algorithm and a service provider preference algorithm, wherein each output sub-stream is associated with a respective weight.

19. The apparatus of claim 18, wherein the respective weight of an output sub-stream is defined by one or more of a preferred spectral fragment, a preferred spectral fragment type, a preferred communication channel, a preferred communication channel type, a preferred traffic type, or a preferred customer.

20. A non-transitory computer-readable storage medium storing instructions which, when executed by a computer, cause the computer to perform a method, the method comprising:
receiving a customer data transmission request for a data stream to be transmitted, the customer data transmission request comprising customer criteria including a bandwidth of the data stream to be transmitted;
obtaining a spectrum-related parameter associated with the customer data transmission request;
identifying a set of available spectral fragments, each of the available spectral fragments being defined by a respective bandwidth size, at least two of the available spectral fragments being separated by an allocated spectral region, at least two of the available spectral fragments having different bandwidth sizes;
allocating at least two of the available spectral fragments for the data stream, based on the customer criteria of the customer data transmission request and the spectrum-related parameter associated with the customer data transmission request, to provide a set of allocated spectral fragments for the data stream, the allocated spectral fragments having a combined bandwidth sufficient to support the bandwidth of the data stream, at least two of the allocated spectral fragments being separated by an allocated spectral region, at least two of the allocated spectral fragments having different bandwidth sizes;
dividing the data stream into a set of output sub-streams, the output sub-streams being associated with respective ones of the allocated spectral fragments and having respective data rates compatible with the respective bandwidth sizes of the respective allocated spectral fragments; modulating the output sub-streams to provide respective modulated signals adapted for transmission via the respective allocated spectral; and
upconverting the modulated signals onto the respective allocated spectral fragments.

21. A computer program product stored in a non-transitory computer-readable storage medium, wherein a computer is operative to process software instructions which adapt the operation of the computer such that the computer performs a method comprising:
receiving a customer data transmission request for a data stream to be transmitted, the customer data transmission request comprising customer criteria including a bandwidth of the data stream to be transmitted;
obtaining a spectrum-related parameter associated with the customer data transmission request;
identifying a set of available spectral fragments, each of the available spectral fragments being defined by a respective bandwidth size, at least two of the available spectral fragments being separated by an allocated spectral region, at least two of the available spectral fragments having different bandwidth sizes;
allocating at least two of the available spectral fragments for the data stream, based on the customer criteria of the customer data transmission request and the spectrum-related parameter associated with the customer data transmission request, to provide a set of allocated spectral fragments for the data stream, the allocated spectral fragments having a combined bandwidth sufficient to support the bandwidth of the data stream, at least two of the allocated spectral fragments being separated by an allocated spectral region, at least two of the allocated spectral fragments having different bandwidth sizes;
dividing the data stream into a set of output sub-streams, the output sub-streams being associated with respective ones of the allocated spectral fragments and having respective data rates compatible with the respective bandwidth sizes of the respective allocated spectral fragments; modulating the output sub-streams to provide respective modulated signals adapted for transmission via the respective allocated spectral fragments; and
upconverting the modulated signals onto the respective allocated spectral fragments.

* * * * *